Patented Mar. 2, 1954

2,671,042

UNITED STATES PATENT OFFICE 2,671,042

METHOD OF BONDING REGENERATED CELLULOSE TO RUBBER AND AN ADHESIVE FINISH FOR THE PURPOSE

Jefferson Adger Stokes, Richmond, Va., assignor to E. I. du Pont de Nemours and Company, Wilmington, Del., a corporation of Delaware No Drawing. Application May 12, 1950,
Serial No. 161,719

6 Claims. (Cl. 154—136)

This invention relates to improved dressing compositions and especially compositions for application to rayon structures, such as strands, ribbons, yarns, etc. intended for use in reinforcing rubber goods.

For the maintenance of quality and the preservation of strength, fatigue resistance and other physical properties rayon yarns are treated with a lubricating and softening finish at an early stage in their production. The yarns are thus able to endure subsequent twisting, plying and rewinding without excessive degradation and may be formed into suitable structures such as cords for reinforcing rubber goods.

Each step that involves the transfer of the yarn from one package to another tends to increase degradation as reflected by quality and physical properties and at the same time increases the cost of the ultimate product. Many attempts have been made to reduce the number of transfers and the more satisfactory processes now in use involve very substantially fewer handlings or transfers than were in use some years ago. In spite of the many attempts already made to eliminate handling and rewinding, it has long been felt essential for the production of good products to finish the yarn at an early stage and subsequently and only after formation of the cord or other rubber-reinforcing structure, to apply then the adhesive or bonding agent.

Since rayon adheres poorly to rubber, the yarn structure must be supplied with a suitable adhesive prior to its combination with the rubber and this has necessitated an additional step in reinforced rubber goods fabrication. Further, the application of conventional adhesive alone, such as resorcinol-formaldehyde natural rubber latex adhesives, to yarns which are later twisted into cords results in cords of lower cord strengths.

It is, therefore, an object of this invention to provide a new composition for treating strong rayon yarns to soften and lubricate the yarns suitably and to provide the necessary bonding agent when the yarns are subsequently united with rubber in the form of rayon reinforced rubber articles. Another object of this invention is to provide a new method in the bonding of rayon to rubber, comprising the improvement of applying to the rayon a combined finish and adhesive composition which provides satisfactory bonding strengths to rubber without appreciably reducing the strength of the rayon, whereby the finish and adhesive may be applied directly and together with an attendant economy. Other objects will be apparent from the description that follows.

This invention comprises finishing rayon yarn at an early stage in its production with a composition containing both a finish (lubricating and softening) ingredient and a rayon to rubber adhesive agent. Specifically the composition of this invention embraces (1) as finish and softening agents, the amine soaps of the higher saturated and unsaturated aliphatic acids and (2) an adhesive comprising a phenolaldehyde resin and a butadiene copolymer latex wherein the ratio of butadiene to other copolymerized ingredients is in the range of from 1:1 to 40:1. The phenol-aldehyde resin may be formed before adding it to the latex. Alternatively, the ingredients for forming the resin may be added to the latex along with a resin forming catalyst, such as sodium hydroxide. The phenols which may be used include phenol, cresol, xylenol and especially a polyphenol such as resorcinol, phloroglucinol, orcinol and others. The aldehyde or aldehyde yielding material may be formaldehyde, acetaldehyde, furfural, etc.

As previously mentioned, the finish ingredients that have been found very useful when combined with certain adhesive-forming ingredients are the amine soaps of higher hydrocarbon fatty acids, said acids being saturated or unsaturated and in the range of from 10 to 18 carbon atoms, those having 12 to 18 being preferred. Suitable finish ingredients are the amine soaps such as triethanolamine stearate, diethylene triamine stearate, ethylene diamine stearate, monoethanolamine stearate, diethanolamine stearate, triethanolamine oleate, isopropanolamine myristate, triethanolamine laurate, morpholine stearate, triethanolamine palmitate, triethanolamine elaidate, diethylene triamine laurate, diethylene triamine myristate, diethylene triamine palmitate, triethanolamine linoleate, triethanolamine linolenate, triethanolamine erucate, ethylene diamine laurate, ethylene diamine myristate, ethylene diamine palmitate, isopropanol amine stearate, isopropanol amine palmitate, ethanolamine palmitate, diethanolamine palmitate, etc. In general, any amine soap of such fatty acids may be used.

Many softening and lubricating agents normally used on regenerated cellulose rayon yarns may be used effectively if the yarns containing these agents are dried and then subjected to adhesive treatment. In such three step processes satisfactory bond strengths are obtained. However, if the same agents are incorporated in the adhesive compositions and the resultant mixtures are applied to the yarns which are then dried, unsatisfactory results are obtained. The bond strengths decrease appreciably. For example, such commonly used finished ingredients as sodium oleate, sulfated vegetable oils, lecithin and others show very noticeably lower bond strengths in combined applications using resorcinol formaldehyde/butadiene copolymer adhesives. However, some of these finish ingredients may be used in combination with the amine soaps without loss in bond strengths. In view of the fact that conventional finishes cannot be used directly in admixture with phenol-aldehyde compositions, it is indeed surprising that the amine soaps and phenol-aldehyde adhesives of this invention can be used so effectively.

The adhesive part of the composition is made up of two parts: (1) a phenol-aldehyde resin or resin-forming ingredients and (2) a synthetic rubber latex as will be more fully described hereinafter. The resin-forming part of this composition is thoroughly explained in Charch and Maney U. S. Patent 2,128,229 and preferably comprises resorcinol, formaldehyde and caustic soda (the catalyst). The latex is a copolymer of butadiene and one or more ethylenic unsaturated compounds such as 2-vinyl pyridine or other vinyl pyridines such as 5-ethyl-2-vinylpyridine and 5-vinyl-2-methylpyridine, acrylonitrile, vinylidene chloride etc. wherein the ratio of butadiene to the ethylenic unsaturated compound is in the range of from 1:1 to 40:1 and preferably from about 3:1 to 19:1. At least 50% of the butadiene copolymer is derived from butadiene. The ratio of the phenol-aldehyde resin to the butadiene copolymer in the composition should be from about 1:9 to 1:1.

Other latices, for instance natural rubber latex, were found to give poor adhesion and/or substantially lowered cord strengths when mixed with resorcinol-formaldehyde resin and any of the finish ingredients previously mentioned, although when used without any finish ingredient the combination of resorcinol-formaldehyde resin and natural rubber latex has given very satisfactory adhesion results.

The ratio of finish to adhesive in the whole composition is preferably from 1:1 to 3:1. For instance, aqueous compositions containing 0.5% resorcinol-formaldehyde resin, 1.5% butadiene copolymer and about 5% of the amine soap have proved very satisfactory. A preferred formulation contains 3% adhesive (with a resin to rubber ratio of 37.5 to 62.5) and 5% amine soap. For example, with 3% of an adhesive made up of 37.5% resorcinol-formaldehyde resin and 62.5% butadiene-vinyl pyridine copolymer (85:15) and 5% triethanolamine stearate, there is obtained a bond strength of 20–21 lbs. and a cord strength of 9.6 kg. with 3–5% of the adhesive-finish being on the yarn. Of course, it is possible to use higher concentrations of finish and adhesive and to vary the ratios of resin to rubber considerably.

The combined compositions of this invention may be conveniently applied to wet or dry regenerated cellulose yarn in the normal course of manufacture as for instance by passing the washed but undried yarns as a warp through the composition over or under rods, if desired, and thence to the drying cans of the conventional slasher. If desired, the emulsion of resin, latex and finish ingredients may be introduced into the bucked cake of rayon just after washing and prior to rewinding or the composition may be applied during any rewinding step after the yarn has been washed. The application is so adjusted or controlled that about 2 to 5 or 6% of nonvolatiles are applied to the yarn based on the air dry weight of the yarn.

Following the application of the finish-adhesive composition the yarn may be dried, if necessary, and wound to a beam, a spool, a cone or collected in any desired package form. The composition softens and lubricates the yarn during any subsequent transfer so that even after doubling and twisting and fabricating into tire fabric the yarn is found to retain a high proportion of its original strength. Also in the case of rubber goods reinforced with braided yarn or cord structures there remains in the final reinforcing structure a high level of strength and desirable physical properties. The final structures are used directly in the rubber goods without dipping, drying and rewinding as has previously been done to supply satisfactory bonding agents and the final products have been found to be entirely satisfactory.

To further illustrate this invention the following data are given in Table I on cord strengths and bond strengths obtained experimentally after the treatment indicated. In all cases the yarn was 1650 denier regenerated cellulose continuous filament yarn spun from viscose in a zinc sulfate-sulfuric acid-sodium sulfate bath, treated with and stretched before wind-up in a diluted spin bath heated to above 70° C. and finally centrifugally wound up in a spinning bucket. The cakes of yarn were drip or centrifugally washed and dried by unwinding and passing as a warp over slasher cans. The various treating compositions were applied to the yarn during this passage from the wet cake creels to the drying cans by dipping the wet yarn into a trough containing the composition. Each of the treated and untreated yarns was subsequently plied with twisting to form two-ply cords (about 3750–3850 denier) of the type commonly used in reinforcing rubber. The cords were conditioned for 24 hours at 70° F. and 60% relative humidity and tested for breaking strength by the usual procedure on a Scott Inclined Tension Tester. The total breaking load is recorded in kilograms. The treated cords are embedded in rubber which is then vulcanized and the bond strength test is carried out, according to the procedure described by Lyons, Nelson and Conrad, India Rubber World, volume 114, page 213 (1946). This test is referred to as the "H" test and is a measurement of the force required to pull out a single cord in the direction of its axis from a strip of rubber in which the cord is embedded.

TABLE

| | Concentration of Adhesive-Finish Solution, Percent | Adhesive-Finish on Yarn, Percent | Conditioned Cord Strength, Kg. | Bond Strength at 24° C. in lbs. |
|---|---|---|---|---|
| None | 0 | 0 | 10.2 | 7.2 |
| *R (alone) | 2.0 | 1.0 | 8.6 | 14.2 |
| *R (alone) | 18.4 | 16.0 | 7.5 | 22.0 |
| *R + Triethanolamine Stearate | 2.0 / 5.0 | 3-4 | 9.6 | 18.0 |
| *R-2 + Triethanolamine Stearate | 3.0 / 5.0 | 3-5 | 9.6 | 20-21 |
| *R + Triethanolamine Oleate | 2.0 / 5.0 | 3.2 | 9.3 | 16.0 |
| *R + Isopropanolamine Myristate | 2.0 / 5.0 | 2.7 | 9.1 | 16.2 |
| *R + Morpholine Stearate | 2.0 / 2.5 | 3.1 | 9.7 | 14.5 |
| *R + Triethanolamine Stearate | 2.0 / 5.0 | 4.6 | 9.4 | 18.0 |
| *R + Ethylene Diamine Stearate | 2.0 / 2.5 | 2.7 | 9.5 | 17.1 |
| *R + Diethylene Triamine Stearate | 2.0 / 5.0 | 3-4 | 8.3 | 15.0 |
| *RA + Triethanolamine Stearate | 2.0 / 5.0 | 3± | 9.1 | 14.9 |
| *RB + Triethanolamine Stearate | 2.0 / 5.0 | 3± | 9.3 | 14.8 |
| *RC + Triethanolamine Stearate | 2.0 / 5.0 | 3± | 9.6 | 13.5 |
| *RD + Triethanolamine Stearate | 2.0 / 5.0 | 3± | 9.6 | 15.0 |
| *RE + Triethanolamine Stearate | 2.0 / 5.0 | 3± | 9.5 | 17.4 |

*R—Resorcinol-formaldehyde resin 25% and butadiene/2-vinyl pyridine copolymer (85:15) 75%.
*R-2—Resorcinol-formaldehyde resin 37.5% and butadiene/2-vinyl pyridine copolymer (85:15) 62.5%.
*RA—Resorcinol-formaldehyde resin 25% and butadiene/2-vinyl pyridine-acrylonitrile copolymer (85:5:10) 75%.
*RB—Resorcinol-formaldehyde resin 25% and butadiene/2-vinyl pyridine-acrylonitrile copolymer (80:10:10) 75%.
*RC—Resorcinol-formaldehyde resin 25% and butadiene/2-vinyl pyridine-acrylonitrile copolymer (50:15:35) 75%.
*RD—Resorcinol-formaldehyde resin 25% and butadiene/2-vinylidene chloride chloride copolymer (85:15) 75%.
*RE—Resorcinal-formaldehyde resin 25% and butadiene/2-vinyl pyridine, vinylidene chloride copolymer (75:15:10) 75%.

While the above examples relate chiefly to yarns of regenerated cellulose, it is to be understood that this invention may be applied to any structure thereof including strands, films, ribbons, cords, etc.

With this combined finish-adhesive composition it is possible to maintain substantially all the strength initially in the yarn and at the same time provide improvements in bond strength of the order of 100% or more, over those obtained without using adhesive. Further, when 2% of the adhesive mixture is used alone, the bonding strength is about 14 lbs., whereas when about 5% of the amine soap is added, the strength becomes an average of about 16 lbs. as shown. In order to get similar bond strengths using the adhesive without the amine soap greater concentrations of the adhesive are required. This greater concentration of adhesive tends to lower cord strength but by use of the combined adhesive-finish good cord strength is maintained without the sacrifice of bond strength. This is indeed a long sought for desideratum and the single application of both a finish and a bonding agent very markedly reduces the cost of cord or other rubber reinforcing structures. Also, for some applications, such as in making flat belting, it avoids the necessity of applying an adhesive prior to latex dipping as is frequently done.

Any departure from the above description which conforms to the present invention is intended to be included within the scope of the claims.

I claim:

1. In the bonding of a regenerated cellulose structure to rubber, the improvement which consists in applying to said structure an aqueous emulsion of a finish comprising an amine soap of a hydrocarbon fatty acid having from 10 to 18 carbon atoms and an adhesive comprising a heat-hardening phenol-aldehyde resin and a butadiene copolymer latex wherein the ratio of butadiene to other copolymerized ingredients is in the range of from 1:1 to 40:1 and the ratio of resin to copolymer is from 1:9 to 1:1, and then drying said structure prior to bonding to rubber.

2. An adhesive-finish for regenerated cellulose structures which comprises an aqueous emulsion of a finish comprising an amine soap of a hydrocarbon fatty acid having from 10 to 18 carbon atoms and an adhesive comprising a heat-hardening phenol-aldehyde resin and a synthetic rubber butadiene copolymer latex wherein the ratio of butadiene to other copolymerized ingredients is in the range of from 1:1 to 40:1 and the ratio of resin to copolymer is from 1:9 to 1:1.

3. An adhesive-finish for regenerated cellulose structures which comprises an aqueous emulsion of a finish comprising a triethanolamine soap of a hydrocarbon fatty acid having from 10 to 18 carbon atoms and an adhesive comprising a heat-hardening phenol-aldehyde resin and a synthetic rubber butadiene copolymer latex wherein the ratio of butadiene to other copolymerized ingredients is in the range of from 1:1 to 40:1 and the ratio of resin to copolymer is from 1:9 to 1:1.

4. An adhesive-finish for regenerated cellulose structures which comprises an aqueous emulsion of a finish comprising a triethanolamine soap of a hydrocarbon fatty acid having from 10 to 18 carbon atoms and an adhesive comprising a heat-hardening phenol-aldehyde resin and a synthetic rubber butadiene-vinylpyridine copolymer latex wherein the ratio of butadiene to other co- 1:1 to 40:1 and the ratio of resin to copolymer is polymerized ingredients is in the range of from from 1:9 to 1:1.

5. An adhesive-finish for regenerated cellulose structures which comprises an aqueous emulsion of a finish comprising a triethanolamine soap of a hydrocarbon fatty acid having from 10 to 18 carbon atoms and an adhesive comprising a heat-hardening resorcinol-formaldehyde resin and a synthetic rubber butadiene-vinylpyridine copolymer latex wherein the ratio of butadiene to other copolymerized ingredients is in the range of from 1:1 to 40:1 and the ratio of resin to copolymer is from 1:9 to 1:1.

6. An adhesive-finish for regenerated cellulose structures which comprises an aqueous emulsion of a finish comprising a triethanolamine stearate and an adhesive comprising a heat-hardening phenol-aldehyde resin and a synthetic rubber butadiene-vinylpyridine copolymer latex wherein the ratio of butadiene to other copolymerized ingredients is in the range of from 1:1 to 40:1 and the ratio of resin to copolymer is from 1:9 to 1:1.

JEFFERSON ADGER STOKES.

References Cited in the file of this patent

UNITED STATES PATENTS

| Number | Name | Date |
|---|---|---|
| 2,128,229 | Charch et al. | Aug. 30, 1938 |
| 2,256,194 | Crawford | Sept. 16, 1941 |

FOREIGN PATENTS

| Number | Country | Date |
|---|---|---|
| 613,931 | Great Britain | Dec. 7, 1948 |

OTHER REFERENCES

Emulsions and Detergents, Carbide and Carbond Chem. Corp., 8th Ed., July 1, 1949, pp. 5 to 7.